(12) United States Patent
Umeda et al.

(10) Patent No.: US 6,291,918 B1
(45) Date of Patent: *Sep. 18, 2001

(54) ALTERNATOR FOR VEHICLE (75) Inventors: Atsushi Umeda, Okazaki; Tsutomu Shiga, Aichi-ken; Shin Kusase, Oobu, all of (JP)

(73) Assignee: Denso Corporation, Kariya (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,289

(22) Filed: May 26, 1998

(30) Foreign Application Priority Data

| May 26, 1997 | (JP) | ................................... PCT/JP97/01778 |
| Sep. 22, 1997 | (JP) | ................................... PCT/JP97/03374 |
| Sep. 26, 1997 | (JP) | ................................... 9-279752 |

(51) Int. Cl.$^7$ ................................................... H02K 3/34
(52) U.S. Cl. ........................ 310/215; 310/263; 310/216
(58) Field of Search ............................... 310/62, 63, 142, 310/146, 215, 263, 216, 179, 180, 184, 194, 195, 198, 208

(56) References Cited

U.S. PATENT DOCUMENTS

| 1,826,295 | 10/1931 | Apple | 310/201 |
| 4,238,339 | * 12/1980 | Khutoretsky et al. | 310/260 |
| 4,827,172 | * 5/1989 | Kobayashi | 310/216 |
| 4,876,473 | * 10/1989 | Tanaka et al. | 310/216 |
| 5,028,826 | * 7/1991 | Kitamura | 310/51 |
| 5,235,229 | * 8/1993 | Tanaka et al. | 310/62 |
| 5,396,212 | * 3/1995 | Hernandez et al. | 336/223 |
| 5,422,526 | * 6/1995 | Kawabata et al. | 310/201 |
| 5,682,070 | * 10/1997 | Adachi et al. | 310/71 |

FOREIGN PATENT DOCUMENTS

| 2239004 | 8/1972 | (DE) . |
| 507351 | 9/1920 | (FR) . |
| 2376544 | 7/1978 | (FR) . |
| 2584246 | 1/1987 | (FR) . |
| 2594271 | 8/1987 | (FR) . |
| 468827 | 8/1937 | (GB) . |

(List continued on next page.)

OTHER PUBLICATIONS

Patent Abstracts of Japan, vol. 016, No. 018 (E–1155), Jan. 17, 1992 & JP 03 235644 A (Hitachi Ltd.), Oct. 21, 1991.

*Primary Examiner*—Nestor Ramirez
*Assistant Examiner*—Judson H. Jones
(74) *Attorney, Agent, or Firm*—Pillsbury Winthrop LLP (57) ABSTRACT

It is an object of this invention to provide a compact high-power alternator for a vehicle. It is another object of this invention to provide a low-noise alternator for a vehicle which outputs an increased power during operation at a low rotational speed. An alternator 1 for a vehicle includes a stator 2 having inner circumferential surfaces formed with many slots having open ends 35. Teeth ends of the stator between the slots have magnetic-flux collecting projections 36 extending in circumferential directions. The magnetic-flux collecting projections 36 are previously formed by, for example, a pressing process during a stage in which they are thin steel plates. An electric conductor forming a winding 33 has a diameter greater than a width of inner openings of the slots. A piece of the electric conductor extends into a first slot from a first side of the iron core 32, and extends out of the first slot to a second side of the iron core 32 before extending into a second slot, which is distant from the first slot by an electric angle of 180°, from the second side of the iron core 32 and extending out of the second slot to the first side of the iron core 32. The winding 33 has a recurrence of such pieces which forms one phase. The winding 33 has, for example, three phases separated by electric angles of 120°.

14 Claims, 9 Drawing Sheets

FOREIGN PATENT DOCUMENTS

| | | |
|---|---|---|
| 2 202 170 | 9/1988 | (GB). |
| 57-3540 | 1/1982 | (JP). |
| 60-187241 | 9/1985 | (JP). |
| 62-272836 | 11/1987 | (JP). |
| 63-194543 | 8/1988 | (JP). |
| 64-5340 | 1/1989 | (JP). |
| 4-26345 | 1/1992 | (JP). |
| 89/06453 | 7/1989 | (WO). |
| 92/06527 | 4/1992 | (WO). |
| 96/00460 | 1/1996 | (WO). |

* cited by examiner

ALTERNATOR FOR VEHICLE

BACKGROUND OF THE INVENTION

1. Field of the Invention

This invention relates to an alternator for a vehicle such as a passenger automotive vehicle or a truck.

2. Description of the Related Art

To reduce the aerodynamic resistance in a traveling condition, a vehicle body is often formed into a slanted nose shape. Securing a sufficient residential space for a passenger compartment is earnestly demanded. To satisfy these requirements, engine rooms of automotive vehicles have recently been becoming so narrow and crowded that only a limited space is available for installing an alternator. In addition, the temperature of a region around the alternator is often high. Meanwhile, to improve fuel economy, the rotational engine speed tends to be reduced during an idling condition. The rotational speed of the alternator decreases in accordance with the reduction of the rotational engine speed. On the other hand, there is a need for supplying increasing electric loads such as safety control devices, etc. Thus, a high power generating ability of the alternator is strongly required. In other words, a compact high-power alternator for a vehicle is required. Especially, it is desirable that the power generating performance of an alternator is good even when the alternator is operated at a low rotational speed.

Furthermore, it is highly desirable that noises leaking from vehicles should be reduced. Providing a quiet passenger compartment leads to increased product appeal. To this end, the engine noises have recently been lowered. On the other hand, alternators for vehicles which operate at high rotational speeds tend to generate fan noises which may annoy passengers and, wind blocking sounds, and magnetic sounds.

In a general alternator for a vehicle, the greatest heating source is the stator. To attain a high power output and a high efficiency of an alternator, it is conceivable to reduce the resistance of a winding on the stator and thereby to reduce heat loss. Specifically, an electric conductor having a great cross-sectional area is used for the winding. In addition, it is conceivable to increase the ratio of a conductor-occupied area in each slot in the stator to an unoccupied area. This ratio is hereinafter referred to as the space factor.

In a prior-art alternator for a vehicle, a stator has inner circumferential surfaces opposing a rotor and is formed with teeth. Tips of the teeth have magnetic-flux collecting projections extending in circumferential directions. Therefore, open ends of slots in an iron core of the stator are smaller in width than inner portions of the slots. The thickness of an electric conductor for a winding is limited by the width of the open end of each slot. To increase the power output of the prior-art alternator during operation at a low rotational speed, a great length of the magnetic-flux collecting projections is necessary. As the length of the magnetic-flux collecting projections is increased, the open ends of slots are narrower so that a thinner electric conductor is required for the winding. The thinner electric conductor causes an increased resistance of the winding.

Figure 10:
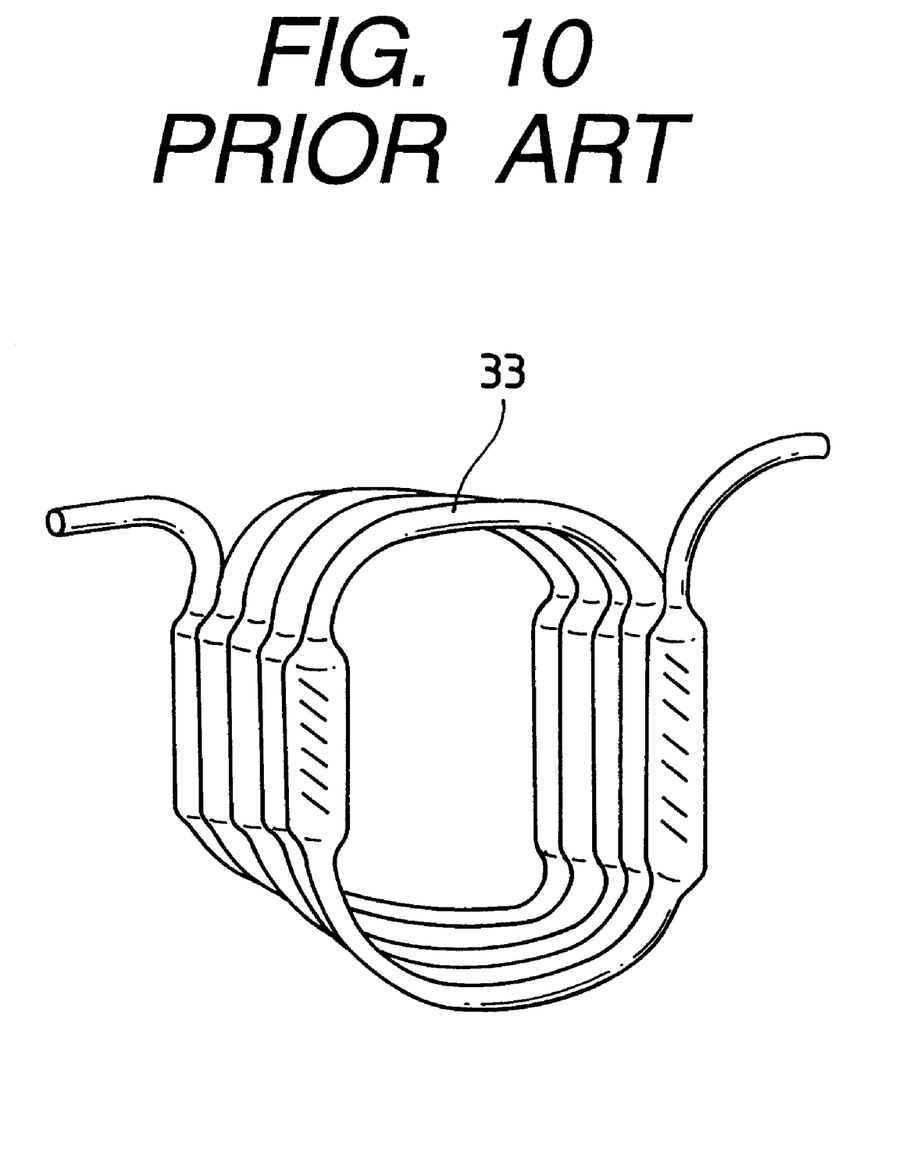
FIG. 10 is a perspective view of a portion of a prior-art previously-formed winding.
Figure 11A:
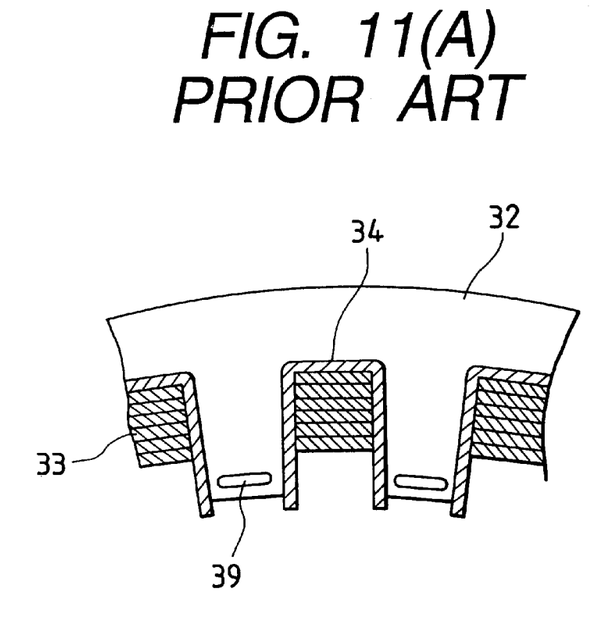
FIG. 11(A) is a sectional view of a portion of a prior-art stator in which magnetic-flux collecting projections have not yet been made.
Figure 11B:
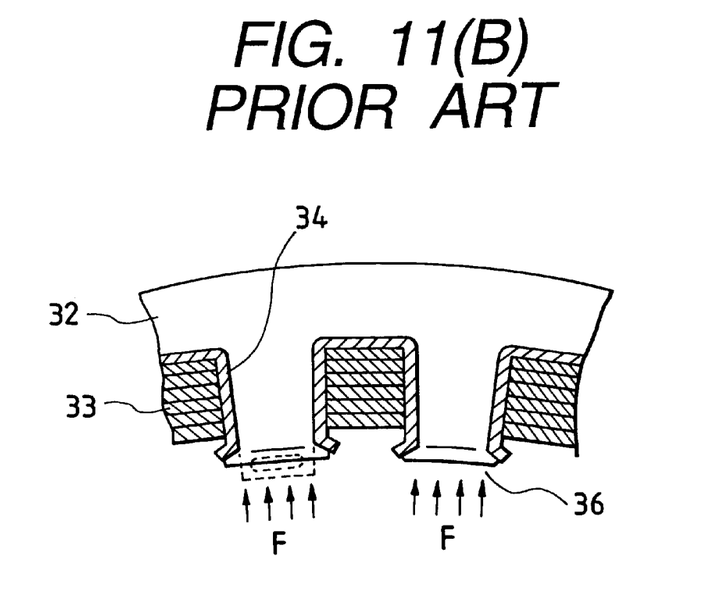
FIG. 11(B) is a sectional view of the portion of the prior-art stator in which the magnetic-flux collecting projections have been made.

Japanese published unexamined patent application 63-194543 discloses that an electric conductor for a winding has portions to be placed in slots, and these portions are previously made into a shape having an approximately rectangular cross-section as shown in FIG. 10. The portions of the electric conductor are placed into the slots as shown in FIG. 11(A). Then, edges of a stator around the slots are plastically deformed into magnetic-flux collecting projections as shown in FIG. 11(B).

In the prior-art structure of Japanese application 63-194543, the plastic deformation needed to make the magnetic-flux collecting projections results in deteriorated magnetic characteristics. As a result, the magnetic-flux collecting effect is reduced. Thus, it is difficult to attain a desired alternator power output. Especially, it is difficult to provide an increased alternator power output during operation at a low rotational speed.

In the prior-art structure of Japanese application 63-194543, the plastic deformation causes a strain in the stator, decreasing the circularity of the inner circumferential surfaces of the stator and hence forming an uneven air gap between the stator and a rotor.

The uneven air gap increases magnetic noise during operation of the prior-art structure.

SUMMARY OF THE INVENTION

In view of the above-mentioned problems, an object of this invention is to provide a compact high-power alternator for a vehicle.

It is another object of this invention to provide a low-noise alternator for a vehicle which outputs an increased power during operation at a low rotational speed.

The present invention is directed to an alternator for a vehicle which comprises a rotor; a stator located outward of the rotor and opposing the rotor; and a frame supporting said rotor and said stator; wherein said stator comprises an iron core and a plurality of electric conductors, said iron core having a plurality of slots, said electric conductors being placed in said slots, said slots having openings, said openings having a width smaller than a width between inner walls defining said slots, the width of said openings of said slots being smaller than a minimal width of said electric conductors.

Thereby, the resistance of the electric conductors is reduced, and the heat loss is reduced during power generating operation. Thus, it is possible to attain a high alternator power output. Since the projecting portions of the stator teeth edges which serve for collecting the magnetic flux are relatively long if the winding diameter remains the same, the inner circumferential surfaces of the stator iron core can be closer to smooth cylindrical surfaces. Thus, it is possible to reduce the wind noise caused by the ruggedness of the inner surfaces of the stator iron core and the radially outward winds caused by the LUNDEL-type pole core during the rotation of the rotor.

In one aspect of the present invention, the slots have two end surfaces in an axial direction of said stator iron core of the stator which are formed with end surface openings as inlets for said electric conductors. Thus, the width of the openings of the slot inner circumferential side can be set without being limited by the width of the electric conductors.

In another aspect of the present invention, openings in inner sides of said slots are narrower than a width of electric conductor accommodating portions of said slots, and are narrower than the minimal width of said electric conductors before said electric conductors are placed into said slots. Thus, it is unnecessary to deform the iron core teeth edges between the slots after the electric conductors are placed into the slots.

Thereby, the projecting portions of the teeth edges of the stator iron core which serve for collecting the magnetic flux can be made into a desired shape without being shaped by plastic deformation. Thus, the material for the projecting portions for collecting the magnetic flux is prevented from being deteriorated in magnetic characteristic, and it is possible to attain an adequate effect of collecting the magnetic flux. Therefore, the power output at a low speed is improved. Since a shape distortion of the teeth edges by plastic deformation is absent, the true circularity of the inner circumferential surfaces of the stator iron core is well maintained. Thus, it is possible to make uniform the air gap between the rotor and the magnetic pole. Thereby, it is possible to suppress the magnetic noise due to an unevenness of the air gap during the generation of electric power.

In another aspect of the present invention, the electric conductors may use electric conductors which have a circular cross-section with a diameter greater than the width of said openings of the slots.

In another aspect of the present invention of claim 5, a cooling fan is disposed at least at one axial end of said rotor opposing said stator. Therefore, winds can be driven from the cooling fan toward the coil ends of the stator winding which project at the axial-direction end of the stator iron core, and hence a high cooling performance is available. Thus, according to the structure of this invention in which the width of the inner circumferential side openings of the slots of the stator is narrow, a cooling wind adequate to cool the stator winding is maintained even if the groove-like wind passages in the axial direction are narrow which are provided by the slots of the stator.

In another aspect of the present invention, cooling fans are disposed at both axial ends of said rotor opposing said stator. Thus, the cooling performance can be further increased, and a higher power output is available.

In another aspect of the present invention, an end surface of said rotor in an axial direction is close to a shroud portion of an air intake peripheral portion of said frame. Thereby, the axial-direction end surface of the rotor cooperates with the shroud portion so that the fan performance of the pole core disc portion is increased. The shroud portion may use the inner wall surface of the frame. Such a structure may be used by only one of the end surfaces of the rotor, or by each of the two end surfaces. Using it with a cooling fan is effective. Such a structure attains a cooling performance equal to that available in the case where a wind is driven only by a cooling fan without increasing the number of parts and the number of processing steps. Thus, it is possible to attain a higher power output. The input side means the side in which an input member for a drive force, for example, a pulley, is provided.

In another aspect of the present invention cross sections of said electric conductors in said slots have substantially a rectangular shape. Thus, the cross-sectional area of the electric conductors in the slots is increased, and hence the space factor related to the electric conductors in the slots (the ratio of a conductor-occupied area in each slot to an unoccupied area) can be increased. As a result, the resistance of the stator winding is reduced, and a higher power output is available. In addition, the area of the opposing surfaces of the electric conductors and the slot inner wall surfaces is increased, and the heat transmission is improved. Thus, a reduction in temperature is available, and consequently a higher power output is available.

In another aspect of the present invention, a plurality of electric conductors are accommodated in said slots while being electrically insulated from each other, and said plurality of said electric conductors form one or more pairs of outer layers located in deep regions of the slots and inner layers located in said opening sides of the slots, and the electric conductors of different layers in different slots among the slots are connected in series to form a stator winding. In the case where a multiple-phase winding is contained in the stator winding, such a structure can prevent the interference between windings of different phases at the coil ends which project at the axial-direction end of the stator iron core. Thus, it is possible to place the electric conductors in deep portions of the slots.

In another aspect of the present invention, a combination of a plurality of electric conductor segments, and each of said electric conductor segments includes an approximately U-shaped segment which has one straight portion accommodated in one slot as an electric conductor of said inner layer, another straight portion accommodated in another slot as an electric conductor in said outer layer, and a turn portion made of a material continuous with the straight portions and connecting the straight portions at one end side. The approximately U-shaped segment is connected to another of said electric conductor segments by a projecting portion from a slot which is provided on another end side of the straight portions. Such a structure enables a plurality of electric conductors to be placed in the slots to form a stator winding even in the case where the inner circumferential side openings of the slots are narrower than the minimum width of the electric conductors. In addition, since there are provided the turn portions, the stator winding can be formed while a step of inserting the electric conductors into the slots and a step of connecting the electric conductors are simplified.

Use of electric conductor segments having such a structure makes it possible to adopt the following structure. The turn portions of the approximately U-shaped segments provided on the stator iron core are arranged and aligned at one end surface of the stator iron core, and the connections among the electric conductors are implemented at only the other end surface side of the stator iron core so that the connecting portions of the electric conductor segments are located at only the other end surface side. According to such an arrangement structure, the winding formation is made easy, and the productivity can be increased.

In another aspect of the present invention, said stator winding comprises a combination of a plurality of electric conductor segments, and each of said electric conductor segments includes a segment which has a straight portion accommodated in said slot as an electric conductor of said inner layer or said outer layer, and which is connected to another of said electric conductor segments by projecting portions from a slot which are provided on two ends of the straight portion. Such a structure enables a plurality of electric conductors to be placed in the slots to form a stator winding even in the case where the inner circumferential side openings of the slots are narrower than the minimum width of the electric conductors. In addition, the shape of the electric conductor segments can be simplified, and hence inexpensive facilities can do manufacture.

In another aspect of the present invention, the electric conductors in the slots have cross sections with substantially a rectangular shape having longer sides extending along a radial direction of the stator, and each of the electric conductors has two surfaces in a longitudinal direction which oppose inner wall surfaces of the slot, and the electric conductors are arranged and accommodated in the slots. Thus, the ratio of the opposing area between the surface of the electric conductors and the iron core can be increased, and the heat transmission from the electric conductors to the iron core can be improved.

DESCRIPTION OF THE PREFERRED EMBODIMENTS

First Embodiment

Figure 1:
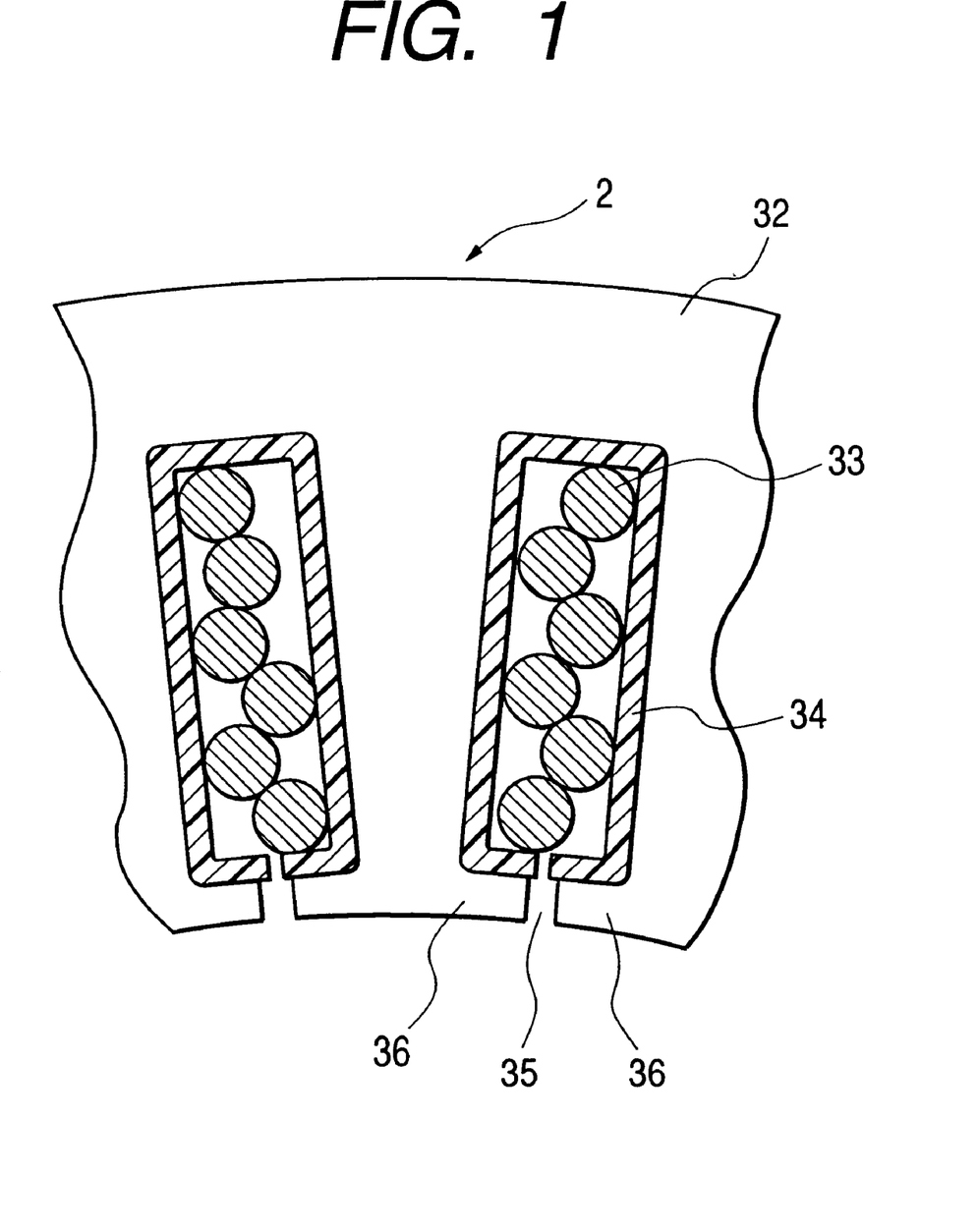
FIG. 1 is a sectional view of a portion of a stator in an alternator for a vehicle according to a first embodiment of this invention.
Figure 2:
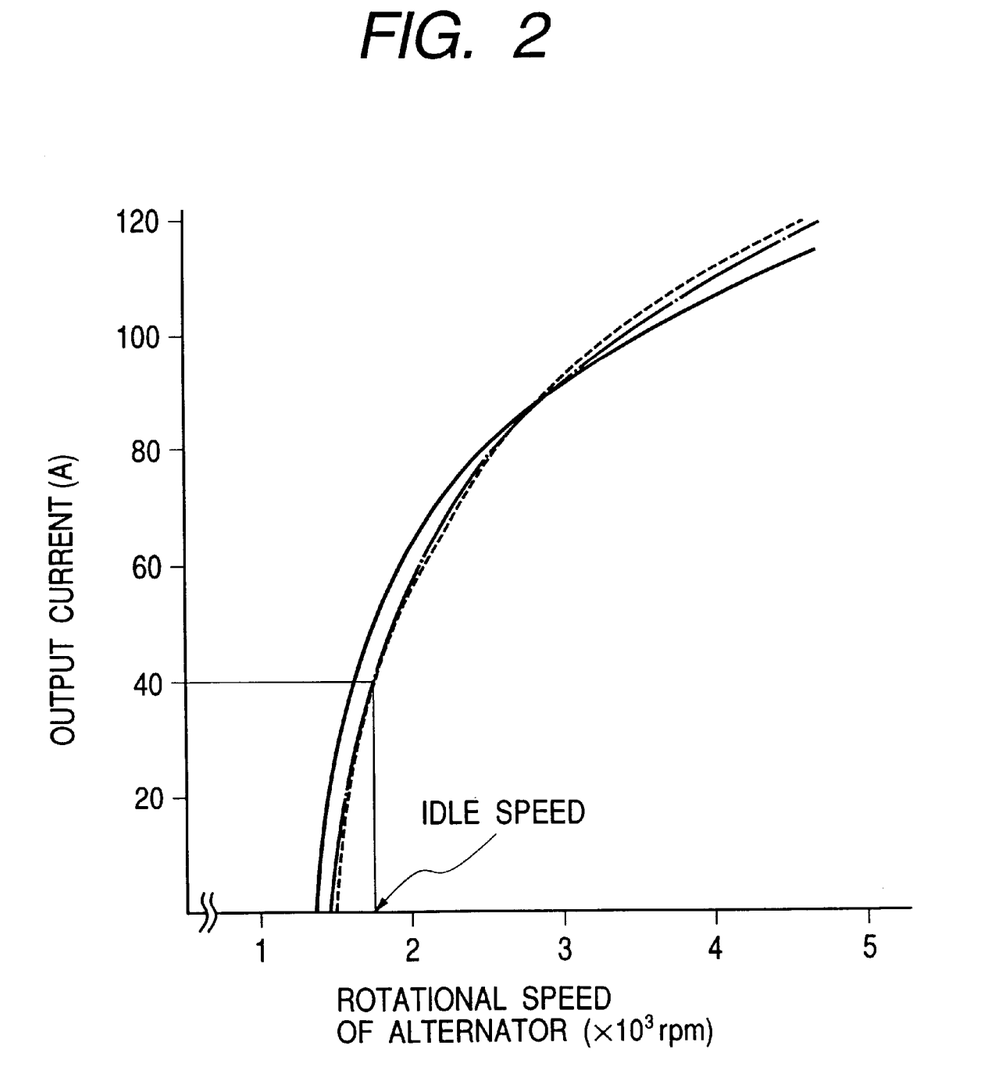
FIG. 2 is a diagram of the relation between an output current and a rotational speed in alternators.
Figure 3:
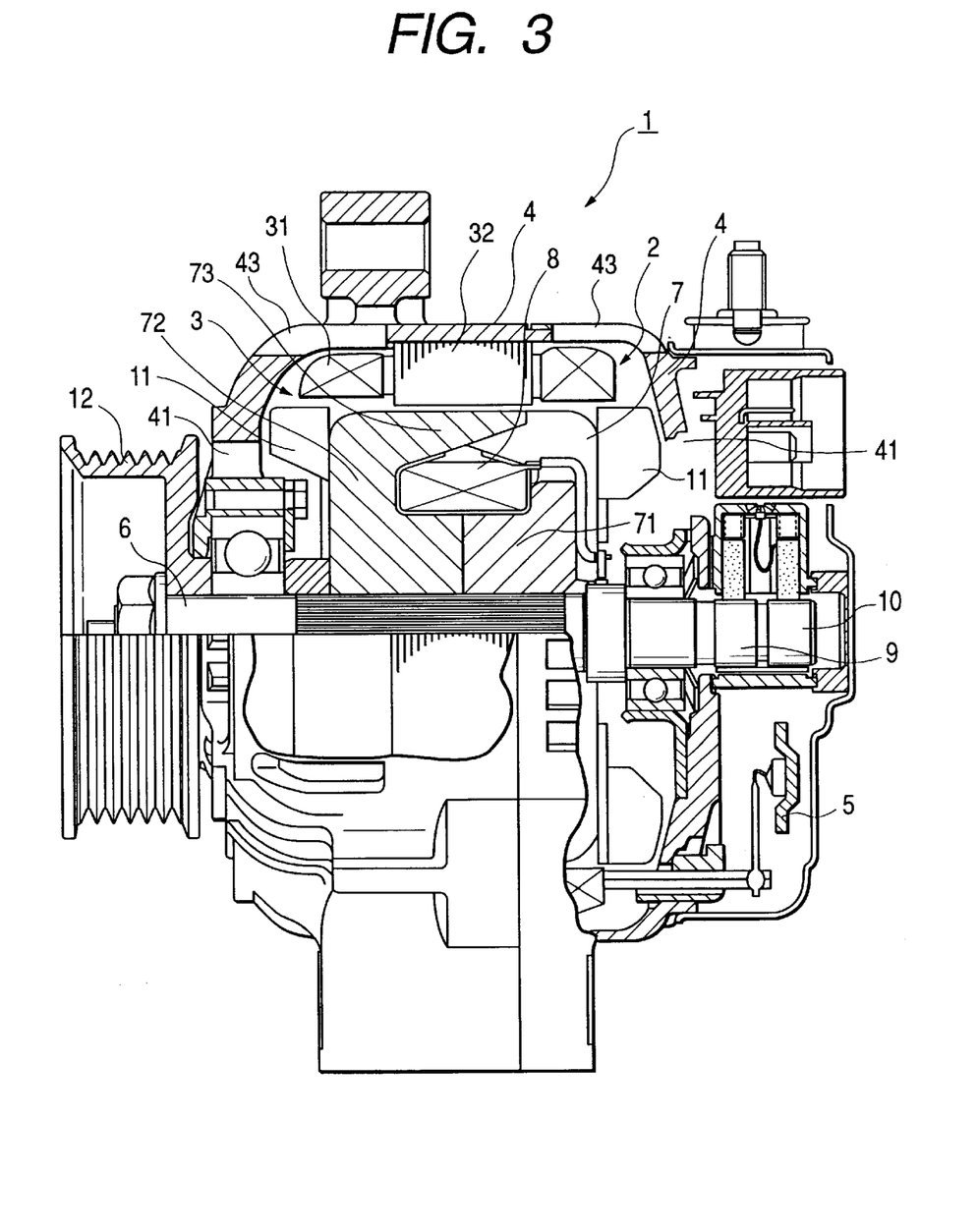
FIG. 3 is a sectional view of the alternator for the vehicle according to the first embodiment of this invention.

With reference to FIGS. 1 to 3, an alternator 1 for a vehicle according to a first embodiment of this invention includes a stator 2, a rotor 3, two frames 4, and a rectifier 5. The stator 2 serves as an armature. The rotor 3 serves to generate a magnetic field. The frame 4 supports the stator 2 and the rotor 3. The rectifier 5 is directly connected to the stator 2. The rectifier 5 converts alternating current power into direct current power. The output side of the rectifier 5 is connected to a battery for generating a voltage of 12 V.

The rotor 3 rotates together with a shaft 6. The rotor 3 includes a set of LUNDEL-type pole cores 7, cooling fans 11, a field coil 8, and slip rings 9 and 10. The shaft 6 is connected to a pulley 12, and is rotated and driven by an engine (not shown) for powering the vehicle.

Each of the LUNDEL-type pole cores 7 includes a boss portion 71, a disk portion 72, and eight claw-like magnetic poles 73. The boss portion 71 is attached to the shaft 6. The disk portion 72 extends from two ends of the boss portion 71 in radial directions.

Portions of the frames 4 which oppose coil ends 31 of the stator 2 have outlets 43 for cooling winds. End faces of the frames 4 in an axial direction have inlets 41 for cooling winds.

The stator 2 includes an iron core 32, a winding 33 provided on the iron core 32, and an insulator 34 for providing electric insulation between the iron core 32 and the winding 33. The winding 33 includes an electric conductor. As previously indicated, the stator 2 is supported by the frame 4. The iron core 32 is of the multiple-layer type. The iron core 32 includes a laminate of thin steel plates. The iron core 32 has inner circumferential surfaces formed with many slots each having an open end 35 serving as an inlet. The iron core 32 has teeth ends between the slots. The teeth ends of the iron core 32 have magnetic-flux collecting projections 36 extending in circumferential directions. The magnetic-flux collecting projections 36 are previously formed by, for example, a pressing process during a stage in which they are thin steel plates.

A wire or an electric conductor forming the winding 33 has a diameter greater than the width of the inner openings of the slots. The iron core 32 has first and second sides in an axial direction. A piece of the winding 33 extends into a first slot from the first side of the iron core 32, and extends out of the first slot to the second side of the iron core 32 before extending into a second slot, which is distant from the first slot by an electric angle of 180°, from the second side of the iron core 32 and extending out of the second slot to the first side of the iron core 32. The winding 33 has a recurrence of such pieces which forms one phase. The winding 33 has, for example, three phases separated by electric angles of 120°. The winding 33 is of, for example, the wave type or the lap type.

An explanation will be given of the advantages provided by the embodiment of this invention. The diameter of the wire or the electric conductor forming the winding 33 can be increased without being limited by the width of the inner openings of the slots. Thus, it is possible to reduce the resistance of the winding 33 and the heat loss. Accordingly, it is possible to attain a high alternator power output.

In a prior-art structure, wedges made of insulating material block the inner openings of slots to prevent a winding from moving out of the slots. In the embodiment of this invention, since the winding 33 does not move out of the slots, it is unnecessary to provide such wedges. Thus, it is possible to reduce the number of parts and the cost.

It is preferable to form the magnetic-flux collecting projections 36 on the teeth ends of the iron core 32 by a process different from plastic deformation. Thus, in this case, it is possible to prevent the magnetic characteristics of the magnetic-flux collecting projections 36 from being deteriorated by plastic deformation. Therefore, the magnetic-flux collecting projections 36 can have sufficient magnetic-flux collecting effects. Accordingly, it is possible to remarkably improve the power output of the alternator 1 during operation at a low rotational speed.

A space factor is defined as corresponding to the ratio of a conductor-occupied area in a slot to the entire area of the slot. First, second, and third alternators are prepared which have equal space factors. The first alternator is a prior-art alternator in which the width of the inner openings of slots is greater than the diameter of a wire forming a winding. In the second alternator, the width of the inner openings of slots is smaller than the diameter of a wire forming a winding, and magnetic-flux collecting projections are formed by plastic deformation. The third alternator is consistent with the alternator 1 of the embodiment of this invention. Accordingly, in the third alternator, the width of the inner openings of slots is smaller than the diameter of a wire forming a winding, and magnetic-flux collecting projections are formed by a process different from plastic deformation. In FIG. 2, the dash line denotes the relation between the output current and the rotational speed of the first alternator, that is, the prior-art alternator. In FIG. 2, the dot-dash line denotes the relation between the output current and the rotational speed of the second alternator. In FIG. 2, the solid line denotes the relation between the output current and the rotational speed of the third alternator, that is, the alternator 1 of the embodiment of this invention. It shown in FIG. 2 that the alternator 1 of the embodiment of this invention outputs a relatively great current during operation at a low rotational speed.

In the embodiment of this invention, the magnetic-flux collecting projections 36 are free from shape strain caused by plastic deformation. Therefore, the circularity of the inner circumferential surfaces of the iron core 32 is good. Thus, it is possible to suppress a magnetic noise increase which would be caused by an unevenness in the air gap between the stator 2 and the rotor 3.

The magnetic-flux collecting projections 36 can be made sufficiently long by a pressing process or another process different from plastic deformation. Thus, the inner circumferential surfaces of the iron core 32 can be close to the surfaces of a true cylinder. Accordingly, it is possible to reduce a wind blocking sound caused by a roughness in the inner circumferential surfaces of the iron core 32 and a centrifugal wind generated by the LUNDEL-type pole cores 7.

A prior-art alternator of the outer-fan type is provided with an external cooling fan. In the prior-art alternator of the outer-fan type, inner openings of slots form axial-direction wind passages.

Thus, in the prior-art alternator of the outer-fan type, if the inner openings of the slots are narrowed as in the embodiment of this invention, resistances to cooling winds increase so that the cooling performance decreases. On the other hand, the alternator 1 of the embodiment of this invention contains the cooling fans therein. In the alternator 1 of the embodiment of this invention, cooling winds introduced along axial directions are discharged in radially outward directions. Thus, in the alternator 1 of the embodiment of this invention, the narrowed inner openings of the slots hardly affect the cooling performance.

Second Embodiment

A second embodiment of this invention is similar to the first embodiment thereof except for design changes indicated hereinafter.

Figure 4:
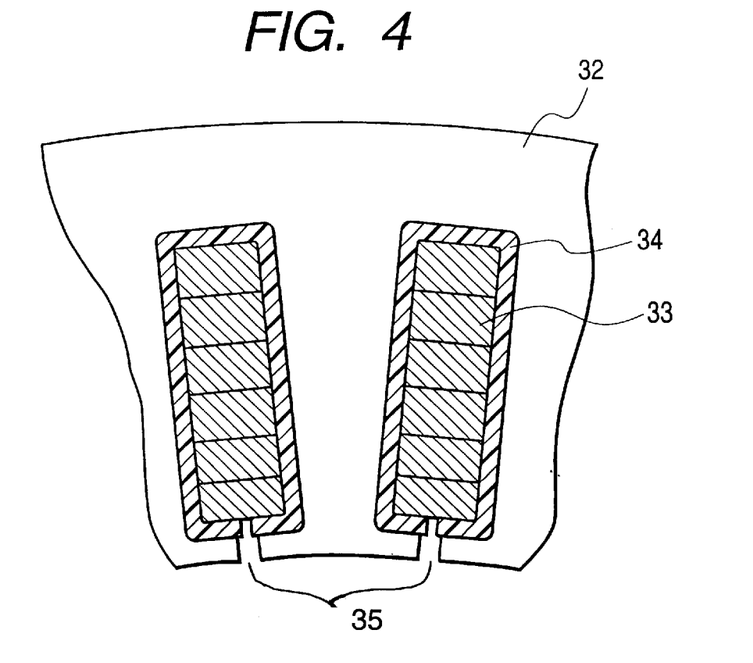
FIG. 4 is a sectional view of a portion of a stator in an alternator for a vehicle according to a second embodiment of this invention.

In the first embodiment of this invention, the electric conductor or the wire which forms the winding 33 has a circular cross-section. On the other hand, in the second embodiment of this invention, at least portions of an electric conductor which extend in slots have an approximately rectangular shape corresponding to the shape of the slots as shown in FIG. 4. Specifically, the portions of the electric conductor have a cross section shaped so that they will have flat surfaces extending along inner wall surfaces of the slots. Thus, the space factor is increased, and the sum of the cross-sectional areas of the portions of the electric conductor in the slots is increased. As a result, it is possible to reduce the electrical resistance of the winding, and to increase the alternator power output.

In the second embodiment of this invention, the area through which the iron core 32 and the winding 33 are in engagement is increased. Therefore, it is possible to provide a good thermal conductivity between the iron core 32 and the winding 33. Thus, it is possible to further lower the temperature of the winding 33. Since the space factor is increased, the hardness of the whole of the stator 2 is increased. Accordingly, it is possible to reduce the magnetic noise.

In addition, since the slot openings 35 are closed by the flat portions of the electric conductors, the inner surfaces of the stator iron core 32 can be closer to smooth cylindrical surfaces in comparison with the case where the stator winding 33 uses a circular wire. Thus, it is possible to further reduce the wind noise caused by the ruggedness of the inner surfaces of the stator iron core 32 and the radially outward winds caused by the LUNDEL-type pole core 7 during the rotation.

Also in this embodiment, dimensions of the cross section of the stator winding 33 are greater than the slot opening width. The cross section of the stator winding 33 has a rectangular shape. The width of its longer sides is greater than the slot opening width. It is preferable that as shown in the drawing, the width of its shorter sides is greater than the slot opening width.

Figure 5:
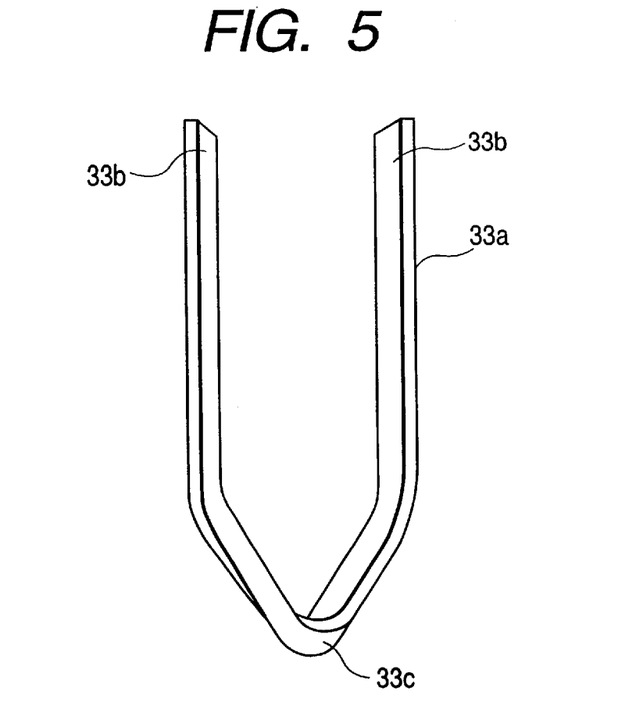
FIG. 5 is a perspective view of an electric conductor segment.

In the first embodiment of this invention, a continuous wire is used to make the winding 33. On the other hand, the second embodiment of this invention uses approximately U-shaped electric conductor segments each having straight portions 33a and a turn portion 33c as shown in FIG. 5. The electric conductor segments are inserted into slots of the iron core 32 along an axial direction in a manner such that the straight portions 33a are aligned. Then, portions of the electric conductor segments on a side of the iron core 32 remote from the turn portions 33c are bent, and ends 33b of the electric conductor segments are connected to complete the winding 33 on the iron core 32. The connection between the ends 33b of the electric conductor segments is implemented by ultrasonic welding, arc welding, brazing, or mechanical processing. It is easier to form the winding 33 than the case where a continuous wire is used to make the winding 33.

Figure 6:
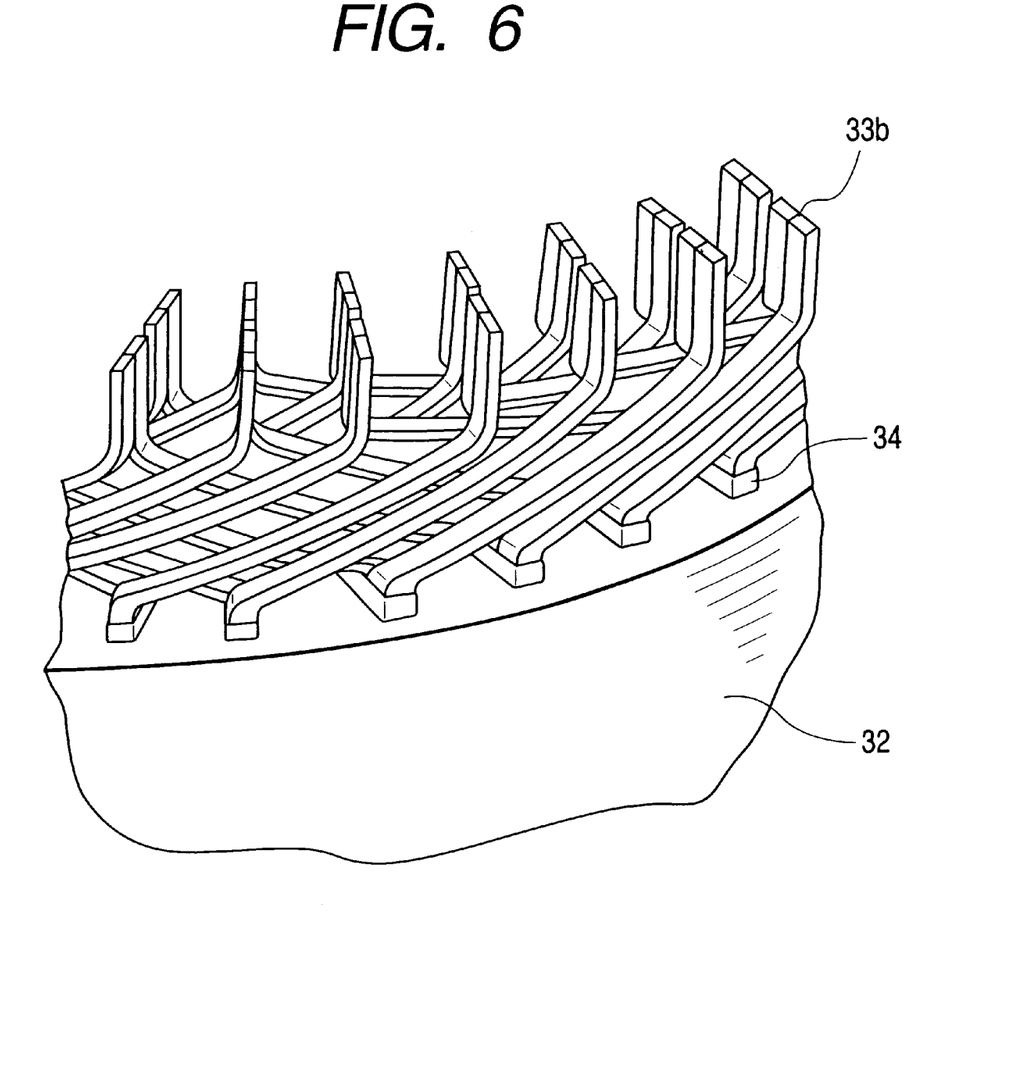
FIG. 6 is a perspective view of coil ends.

Pieces of the electric conductor are separated into outer layers located in deep portions of the slots and inner layers located in inner openings of the slots. At least one pair of such pieces of the electric conductor are provided per slot. Inner-layer and outer-layer pieces of the electric conductor in different slots are connected in series. Thus, as shown in FIG. 6, it is possible to prevent coil ends from interfering with each other. Accordingly, pieces of the electric conductor can be easily placed into deep portions of the slots, and a high occupancy related to the slots is available. In FIG. 6, the number of pieces of the electric conductor per slot corresponds to four turns, and there are two pairs of outer layers and inner layers. Even in the case where the number of pairs differs from two, it is possible to prevent different winding phases from interfering with each other.

In the second embodiment of this invention, the winding is formed by electric conductor segments. In this case, it is easy to make each electric conductor into a rectangular cross-section, and a high space factor is available. The electric conductor segments can be formed by a pressing process. Thus, it is possible to reduce a material cost and a processing cost.

Other Embodiments

Figure 7:
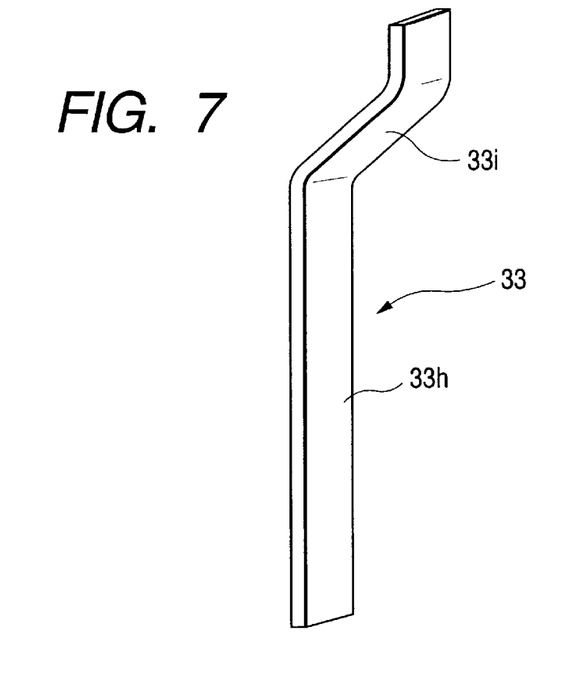
FIG. 7 is a perspective view of an electric conductor segment in another embodiment of this invention.

The second embodiment of this invention uses the approximately U-shaped electric conductor segments. As shown in FIG. 7, approximately J-shaped electric conductor segments may be used. In this case, the approximately J-shaped electric conductor segments are inserted into the slots along the axial direction of the iron core 32 in a manner such that straight portions 33h thereof are aligned. Then, ends of the approximately J-shaped electric conductor segments on each of the two sides of the iron core 32 are connected to complete the winding 33. Since the approximately J-shaped electric conductor segments have simpler shapes, it is easier to make them. Thus, a cost advantage is achieved.

Figure 8:
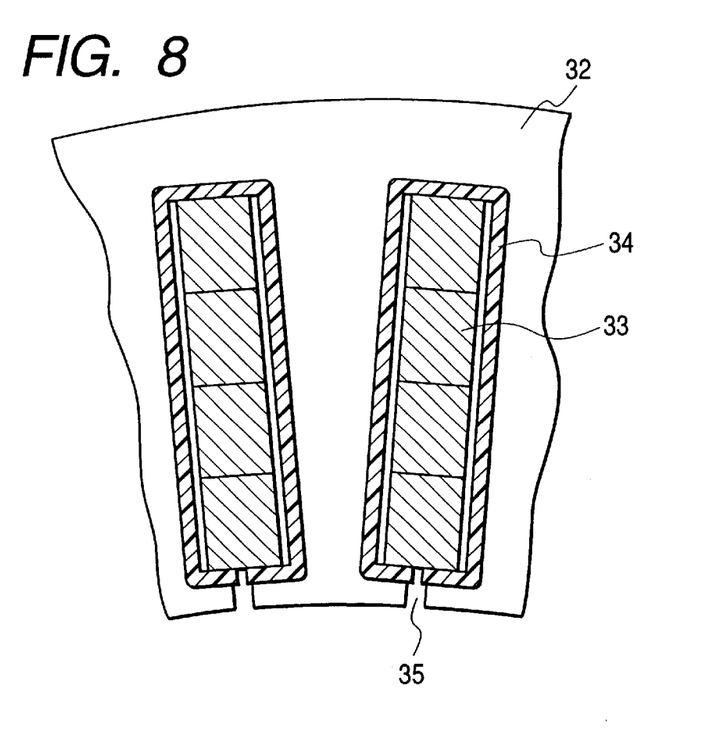
FIG. 8 is a sectional view of an example of a modification of the stator.

In the second embodiment, the cross section of the stator winding 33 has such a rectangular shape that the longer sides thereof are arranged so as to close the slot opening 35. As shown in FIG. 8, in a slot, the stator winding 33 may be arranged in a line of portions along only a radial direction, and the shorter sides thereof may close the slot opening 35. Use of such a longitudinal stack array of electric conductors of rectangular cross-sections enables a greater ratio of an opposing area between the electric conductor surfaces and the iron core in the slots and an improvement of the heat transmission from the electric conductors to the iron core in comparison with the case using electric conductors having cross sections of squares and the case using a lateral stack array of electric conductors of rectangular cross-sections as in FIG. 4. It is possible to increase the gaps in the circumferential direction between the portions of the winding without changing the axial-direction length of the coil ends 31, that is, without increasing the electric resistance value of the winding. This is made clear from FIG. 6 which is a perspective view of the coil ends in the case where the turn number per slot is 4 turns. Accordingly, the wind resistances with respect to the cooling winds in the radially outward directions by the cooling fans 11 can be reduced, and hence the flow rates of the cooling winds can be increased. Since the cooling winds pass through the coil ends 31, the cooling performance is increased and the alternator power output can be further increased.

In the embodiment of this invention which is shown in FIG. 7, the winding 33 has a reduced resistance, and there is a surplus in the cooling performance. Thus, only one cooling fan provided on one end of the rotor 3 is needed. In this case, it is possible to reduce the number of parts and the number of manufacturing steps. Therefore, the alternator can be inexpensive and small in size.

Figure 9:
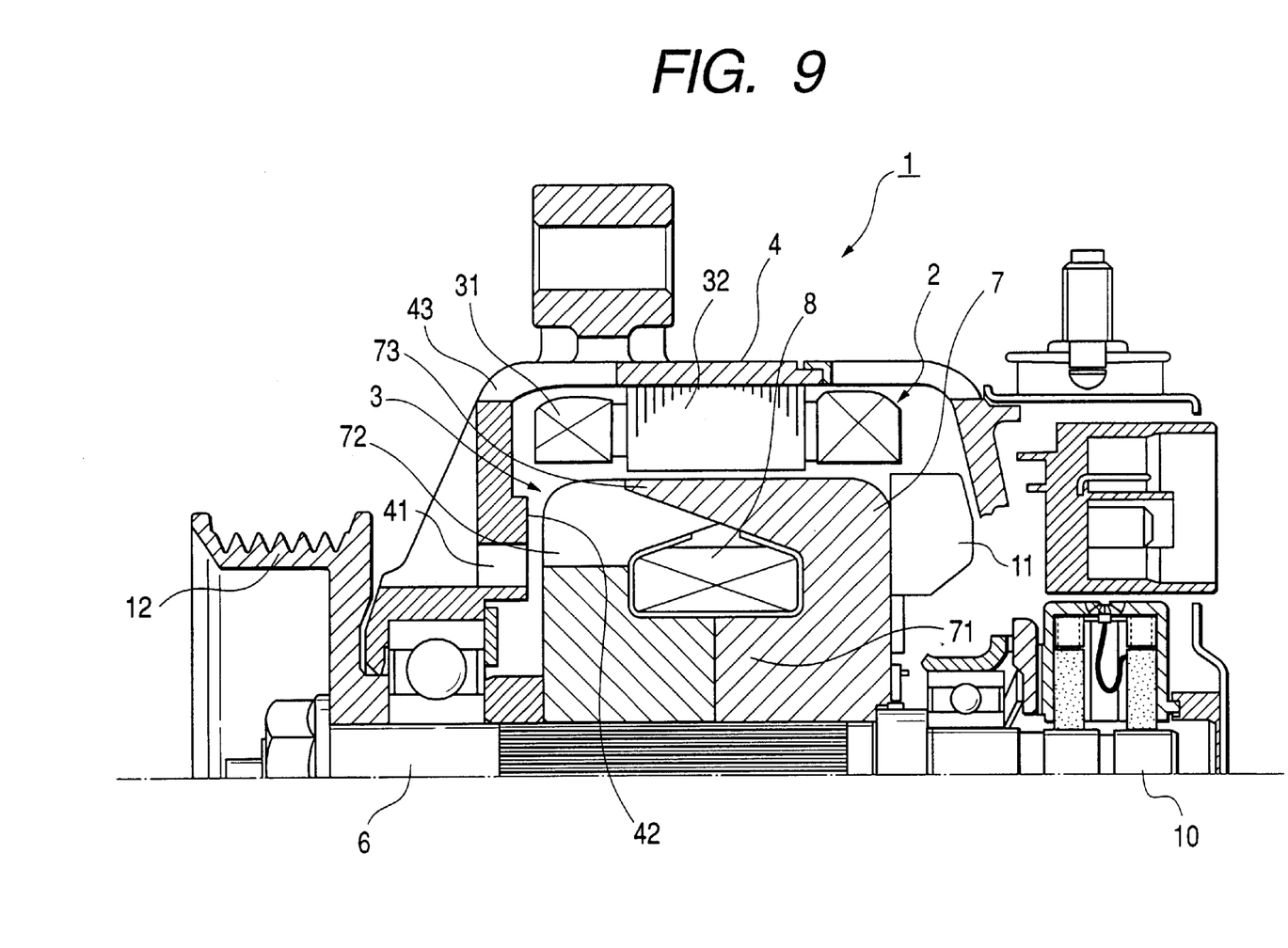
FIG. 9 is a sectional view of an alternator for a vehicle according to another embodiment of this invention.

FIG. 9 shows an alternator having only one cooling fan 11. In the alternator of FIG. 9, an end face of the rotor 3 which is not provided with the cooling fan 11 adjacently opposes the inner wall surfaces 42 of the frame (the housing) 4 around the inlet 41. In this case, the inner wall surfaces of the frame (the housing) 4 serve as a shroud for the cooling fan 11. Thus, the fan ability of the pole core disk portion 72 is increased. Accordingly, it is possible to attain a cooling performance comparable to the cooling performance available in the structure having the two cooling fans while the number of parts and the number of manufacturing steps are not increased. In addition, it is possible to further increase the power output of the alternator.

What is claimed is:

1. An alternator for a vehicle, comprising:

a hollow, cylindrical stator having a longitudinally extending central cavity;

a rotor disposed within said cavity such that the stator opposes the rotor; and a frame supporting said rotor and said stator;

wherein said stator comprises an iron core and a plurality of electric conductors, said iron core having a plurality of slots, said electric conductors being partially placed in said slots, said slots having first, axially extending openings which establish communication between said slots and said cavity, said first openings having a width smaller than a width between inner walls defining said slots, the width of said first openings of said slots being smaller than a minimal width of said electric conductors;

wherein the stator has two end surfaces, in an axial direction of said iron core, which are formed such that one of the two end surfaces has openings constituting second slot openings through which said electric conductors are inserted into said slots, end portions of said electric conductors being bent in circumferential directions at positions immediately outward of said second openings; and wherein said first openings are formed in inner sides of said slots and are narrower than a width of electric conductor-accommodating portions of said slots, wherein each of said slots accommodates a plurality of electric conductors which are in mechanical contact with each other.

2. An alternator according to claim 1, wherein said electric conductors have a circular cross-section with a diameter greater than the width of said first openings of the slots, and said electric conductors are provided in said slots to form a winding on said stator.

3. An alternator according to claim 1, wherein a cooling fan is disposed at least at one axial end of said rotor opposing said stator.

4. An alternator according to claim 3, wherein cooling fans are disposed at both axial ends of said rotor opposing said stator.

5. An alternator according to claim 1, wherein an end surface of said rotor in said axial direction is close to a shroud portion of an air intake peripheral portion of said frame.

6. An alternator according to claim 1, wherein cross sections of said electric conductors in said slots have substantially a rectangular shape.

7. An alternator according to claim 1, wherein said plurality of electric conductors are accommodated in said slots while being electrically insulated from each other; said plurality of electric conductors form one or more pairs of outer layers located in deep regions of the slots and inner layers located in said first opening sides of the slots; the electric conductors of different layers in different slots among the slots extend out of the slots and are connected in series at places outside the slots to form a plurality of stator windings of different phases; and the electric conductors outside the slots are spaced apart from each other.

8. An alternator according to claim 7, wherein said stator winding comprises a combination of a plurality of electric conductor segments, and each of said electric conductor segments includes an approximately U-shaped segment which has one straight portion accommodated in one of said slots as an electric conductor of said inner layer, another straight portion accommodated in another of said slots as an electric conductor in said outer layer, and a turn portion made of a material continuous with the straight portions and connecting the straight portions at one end side, the approximately U-shaped segment being connected to another of said electric conductor segments by a projecting portion from a slot which is provided on another end side of the straight portions.

9. An alternator according to claim 7, wherein said stator winding comprises a combination of a plurality of electric conductor segments, and each of said electric conductor segments includes a segment which has a straight portion accommodated in said slot as an electric conductor of said inner layer or said outer layer, and which is connected to another of said electric conductor segments by projecting portions from a slot which are provided on two ends of the straight portion.

10. An alternator according to claim 6, wherein the electric conductors in the slots have cross sections with substantially a rectangular shape having longer sides extending along a radial direction of the stator, and each of the electric conductors has two surfaces in a longitudinal direction which oppose inner wall surfaces of the slot, and the electric conductors are arranged and accommodated in the slots.

11. An alternator according to claim 8, wherein said plurality of electric conductors are accommodated in said slots while being electrically insulated from each other; said plurality of electric conductors form one or more pairs of outer layers located in deep regions of the slots and inner layers located in said inner sides of the slots having said first openings; the electric conductors of different layers in different slots among the slots extend out of the slots and are connected in series at places outside the slots to form a plurality of stator windings of different phases; and the electric conductors outside the slots are spaced apart from each other.

12. An alternator according to claim 11, wherein said stator winding comprises a combination of a plurality of electric conductor segments, and each of said electric conductor segments includes an approximately U-shaped segment which has one straight portion accommodated in one of said slots as an electric conductor of said inner layer, another straight portion accommodated in another of said slots as an electric conductor in said outer layer, and a turn portion made of a material continuous with the straight portions and connecting the straight portions at one end side, the approximately U-shaped segment being connected to another of said electric conductor segments by a projecting portion from a slot which is provided on another end side of the straight portions.

13. An alternator according to claim 11, wherein said stator winding comprises a combination of a plurality of electric conductor segments, and each of said electric conductor segments includes a segment which has a straight portion accommodated in said slot as an electric conductor of said inner layer or said outer layer, and which is connected to another of said electric conductor segments by projecting portions from a slot which are provided on two ends of the straight portion.

14. An alternator according to claim 1, wherein said plurality of electric conductors accommodated in said slots have portions which are radially aligned, and wherein a first one of a neighboring pair of electric conductors extends out of one of said second openings in a first circumferential direction and a second one of said neighboring pair of electric conductors extends out of said one of said second openings in a second circumferential direction approximately opposite to the first circumferential direction.

\* \* \* \* \*